(12) United States Patent
Tom et al.

(10) Patent No.: US 9,223,410 B1
(45) Date of Patent: Dec. 29, 2015

(54) INPUT FOR COMPUTING DEVICE

(71) Applicant: Google Inc., Mountain View, CA (US)

(72) Inventors: Kevin Tom, San Francisco, CA (US); Felix Jose Alvarez Rivera, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/600,566

(22) Filed: Jan. 20, 2015

Related U.S. Application Data

(62) Division of application No. 13/686,134, filed on Nov. 27, 2012, now Pat. No. 8,971,024.

(51) Int. Cl.
 *H05K 7/00* (2006.01)
 *H05K 5/00* (2006.01)
 *G06F 3/02* (2006.01)

(52) U.S. Cl.
 CPC ..................... *G06F 3/0202* (2013.01)

(58) Field of Classification Search
 CPC ... H01H 13/705; H01Q 1/2266; G06F 3/0231
 USPC ............ 361/679.01–679.09, 679.1–679.19, 361/679.21–679.29, 679.31–679.45, 361/679.55–679.6, 724–747; 348/14.07, 348/51–52, 177, 333.01–333.13, 739; 292/1–62, 113, 169.11–169.23, 292/341.11–341.19
 See application file for complete search history.

(56) References Cited

U.S. PATENT DOCUMENTS

| | | | |
|---|---|---|---|
| 6,507,763 | B1 | 1/2003 | Schneider et al. |
| 7,394,039 | B2 | 7/2008 | Yanagi et al. |
| 7,999,748 | B2 | 8/2011 | Ligtenberg et al. |
| 2002/0138162 | A1 | 9/2002 | Lee et al. |
| 2006/0170656 | A1 | 8/2006 | Kwon |
| 2009/0251384 | A1* | 10/2009 | Ligtenberg et al. ........... 343/904 |
| 2010/0053000 | A1 | 3/2010 | Yanagi et al. |

* cited by examiner

*Primary Examiner* — Jerry Wu
(74) *Attorney, Agent, or Firm* — Lerner, David, Littenberg, Krumholz & Mentlik, LLP

(57) ABSTRACT

Aspects of the disclosure relate generally to inputs for computing devices. For example, an input, such as a keyboard, may include a plurality of layers, such as a base layer. The base layer may include a cutout defined at least partially by interior edges of the base layer. An antenna may be secured to a structural member of the computing device, and the antenna may receive electromagnetic radiation through the cutout in the base layer.

20 Claims, 9 Drawing Sheets

INPUT FOR COMPUTING DEVICE

CROSS-REFERENCE TO RELATED APPLICATIONS

The present application is a divisional of U.S. patent application Ser. No. 13/686,134, filed Nov. 27, 2012, the disclosure of which is incorporated herein by reference.

BACKGROUND

In today's technology landscape, there is an ever-increasing demand for smaller and more compact computing devices, such as mobile devices, laptop computers, etc. However, as such demand increases, so does the demand for faster and more efficient performance of such devices. In this regard, some designers and manufacturers of computing devices struggle with the balancing the demands for both size and performance.

Certain devices include housings or enclosures that are made of metal or other similar materials which are not RF (radio frequency) transparent. In this regard, communications modules placed within the housing or enclosure of the device may not receive incoming RF signals from external sources, since such signals may be blocked by the housing or enclosure.

SUMMARY

One aspect of the disclosure may include a computing device including a processor, a memory coupled to the processor, and an input coupled to the processor. The input may include a top layer including a plurality of key caps, the plurality of key caps configured to receive input from a user, a circuit layer coupled to the processor and being configured to receive the input from each of the plurality of key caps, a base layer disposed adjacent to a surface of the circuit layer, and an antenna mounted on a surface of one of the plurality of key caps that faces the circuit layer, the antenna configured to receive a signal from an external source.

In one example, the base layer may include a cutout formed therein, a perimeter of the cutout being at least partially defined by an interior edge of the base layer.

In one example, the cutout may be defined by a plurality of interior edges of the base layer.

In one example, an area of the cutout may be less than or equal to an area of the antenna.

In one example, an area of the cutout may be greater than or equal to an area of the antenna.

In one example, the top layer may further include a plurality of conductive members, the conductive members being configured to communicate the input from the plurality of key caps to the circuit layer.

In one example, the input may include a holding layer disposed adjacent to a surface of the circuit layer opposed to the surface adjacent to the base layer.

In one example, the plurality of conductive members may be integrally formed with the holding layer.

In one example, the top layer may further include a plurality of biasing members.

In one example, the antenna may be disposed in a space at least partially defined between one of the plurality of domes and one of the plurality of biasing members.

In one example, the one key cap may be a function key cap.
In one example, the one key cap may be a character key cap.
In one example, the one key cap may be a spacebar keycap.

Another aspect of the disclosure may provide an input for a computing device, the input may include a top layer including a plurality of key caps, the plurality of key caps configured to receive input from a user, a circuit layer configured to receive input from each of the plurality of key caps, a base layer disposed adjacent to a surface of the circuit layer, wherein the base layer includes a cutout formed therein, a perimeter of the cutout being at least partially defined by an interior edge of the base layer, and an antenna mounted on a surface of one of the plurality of key caps that faces the circuit layer, the antenna configured to receive a signal from an external source, wherein the antenna at least partially overlaps the cutout in a direction perpendicular to at least one of the top layer, circuit layer, or base layer.

In one example, the cutout may be defined by a plurality of interior edges of the base layer.

In one example, an area of the cutout may be less than or equal to an area of the antenna.

In one example, an area of the cutout may be greater than or equal to an area of the antenna.

In one example, the top layer may further include a plurality of conductive members.

In one example, the input may further include a holding layer disposed adjacent to a surface of the circuit layer opposed to the surface adjacent to the base layer.

In one example, the plurality of conductive members may be integrally formed with the holding layer.

In one example, the top layer may further include a plurality of biasing members.

In one example, the antenna may be disposed in a space at least partially defined between one of the plurality of domes and one of the plurality of biasing members.

In one example, the one key cap may be a function key cap.
In one example, the one key cap may be a character key cap.
In one example, the one key cap may be a spacebar keycap.

Another aspect of the disclosure may provide a computing device including a processor, a memory coupled to the processor, a support structure, an input coupled to the processor, the input including a top layer including a plurality of key caps, the plurality of key caps configured to receive input from a user, a circuit layer coupled to the processor and being configured to receive input from the plurality of key caps, a base layer disposed adjacent to a surface of the circuit layer, wherein the base layer includes a cutout formed therein, a perimeter of the cutout being at least partially defined by an interior edge of the base layer, an antenna mounted on a surface of the support structure that faces the base layer, the antenna configured to receive a signal from an external source, wherein the antenna at least partially overlaps the cutout in a direction perpendicular to at least one of the top layer, circuit layer, or base layer.

In one example, the support structure may be selected from the group including a computing device housing and a bracket.

DETAILED DESCRIPTION

According to one aspect of the disclosure, a computing device and input are described. The input may be a keyboard that may be removably attached to the computing device. The input may have a plurality of layers, such as a top layer, support layer, circuit layer, and a base layer. The top layer may include a plurality of key caps. In one implementation, the base layer may include a cutout defined at least in part by interior edges of the base layer. An antenna may be secured within the housing of the computing device, for example, to a structural member, and may at least partially overlap the cutout in a direction perpendicular to one of the top layer, circuit layer, or base layer. In this regard, the antenna may receive electromagnetic radiation, such as radio waves, through the cutout in the base layer and receive wireless signals from sources external to the computing device. In another implementation, the antenna may be secured to a lower surface of a key cap. In this regard, the base layer may or may not include a cutout, according to aspects of the disclosure.

Figure 1:
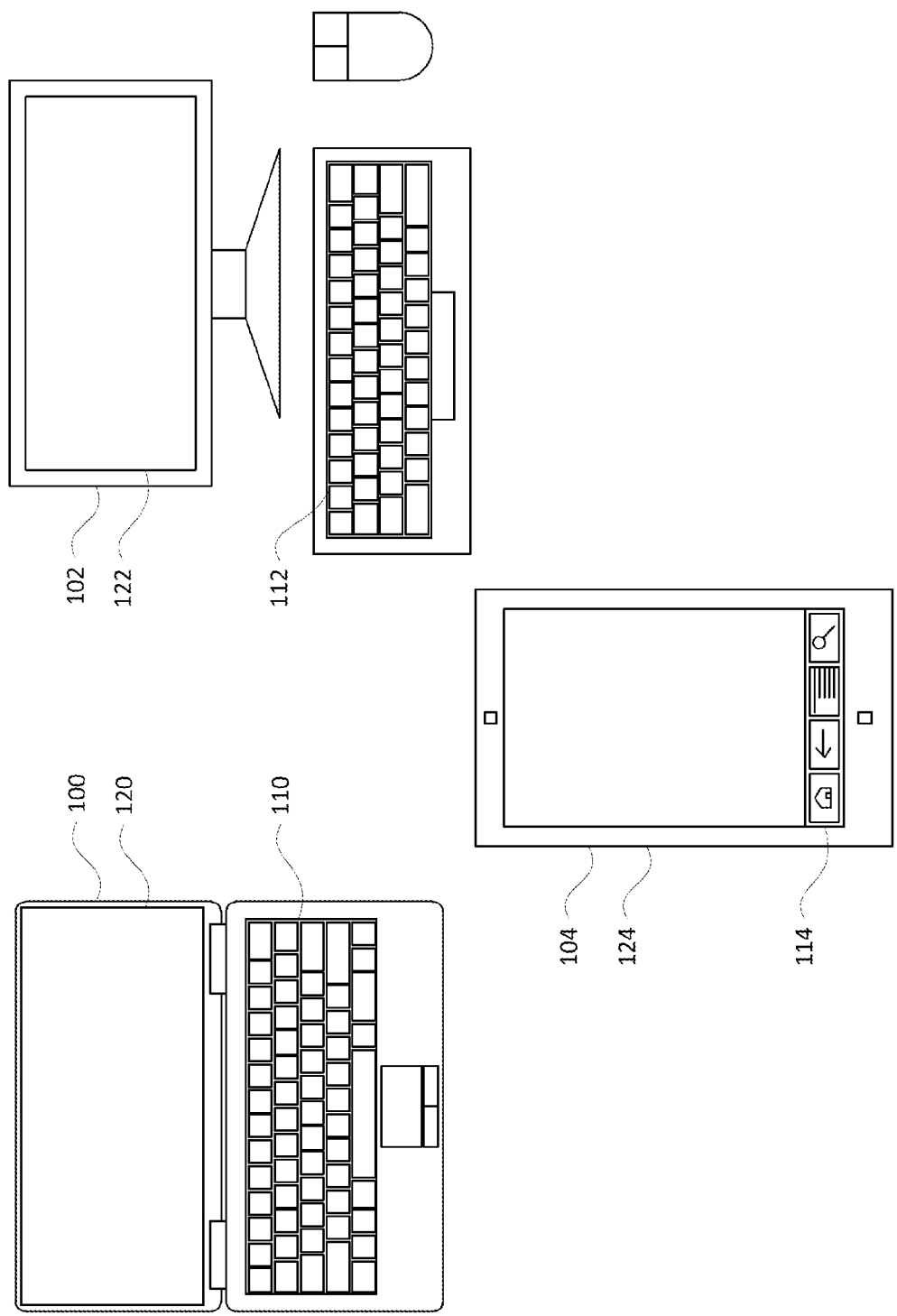
FIG. 1 illustrates examples of devices in accordance with aspects of the disclosure.

FIG. 1 illustrates examples of devices in accordance with aspects of the disclosure. In this figure, devices 100, 102, and 104 comprise a laptop computer, a desktop computer, and a mobile phone, respectively. The features presented herein may also be used in conjunction with other devices which include buttons or keyboards, such as personal digital assistants, tablet PCs, netbooks, laptop computers, desktop computers, e-book readers, etc.

Figure 2:
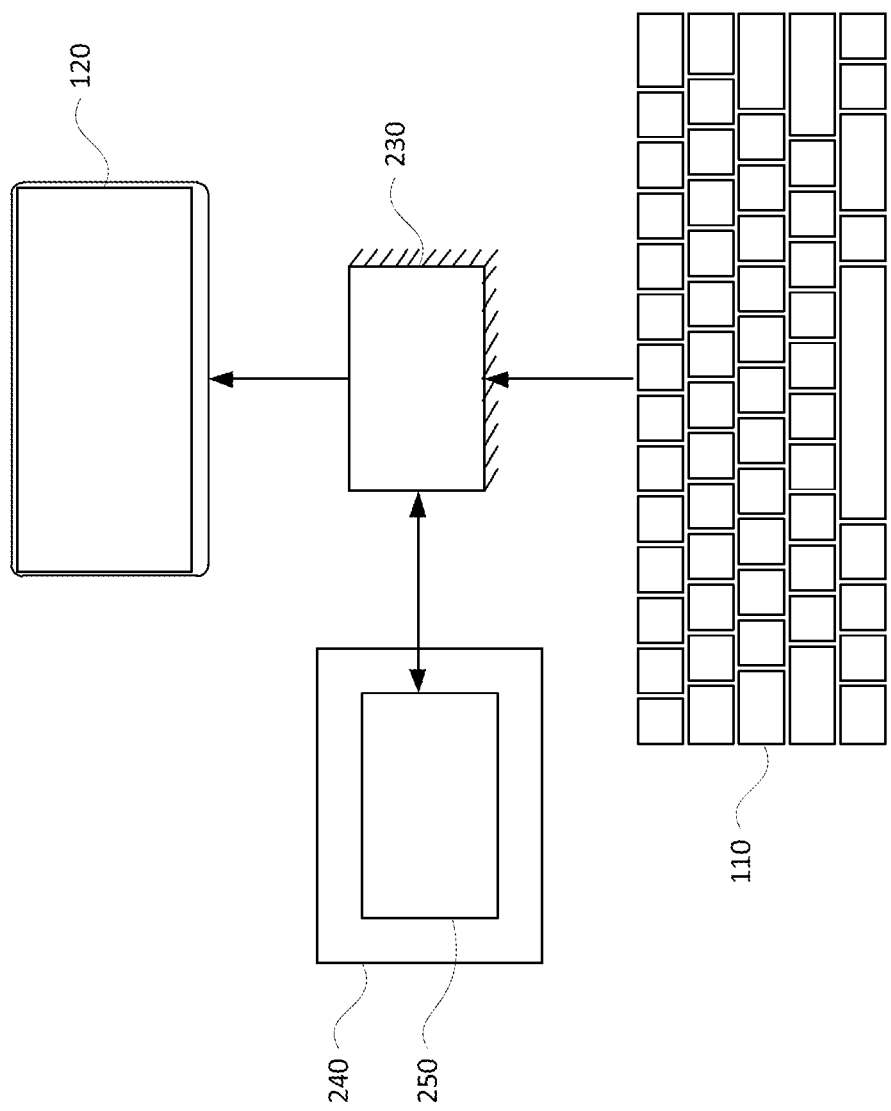
FIG. 2 illustrates a device of FIG. 1 according to aspects of the disclosure.

As shown in FIG. 2, each of the devices of FIGURE may contain a processor 230, memory 240, and other components typically present in general purpose computers. The processor 230 may be any conventional processor, such as commercially available CPUs. Alternatively, the processor may be a dedicated device such as an ASIC or other hardware-based processor. The memory 240 may store information accessible by processor, including instructions 250 that may be executed by the processor.

Returning to FIG. 1, each of these devices may include keys, such as those included in keyboard 110, keyboard 112, and buttons 114. These keys may include on/off switches, volume or brightness toggle buttons, keys of QWERTY or other keyboard, keys of numeric keypads, etc. These devices may also include an electronic display, such as displays 120, 122, and 124, for displaying information input by a user at the keys. For example, as shown in FIG. 2, information input at keyboard 110 is received by a processor 230. The processor 230 may then display the input on display 120 according to the instructions 250 stored in the memory 240.

Figure 3:
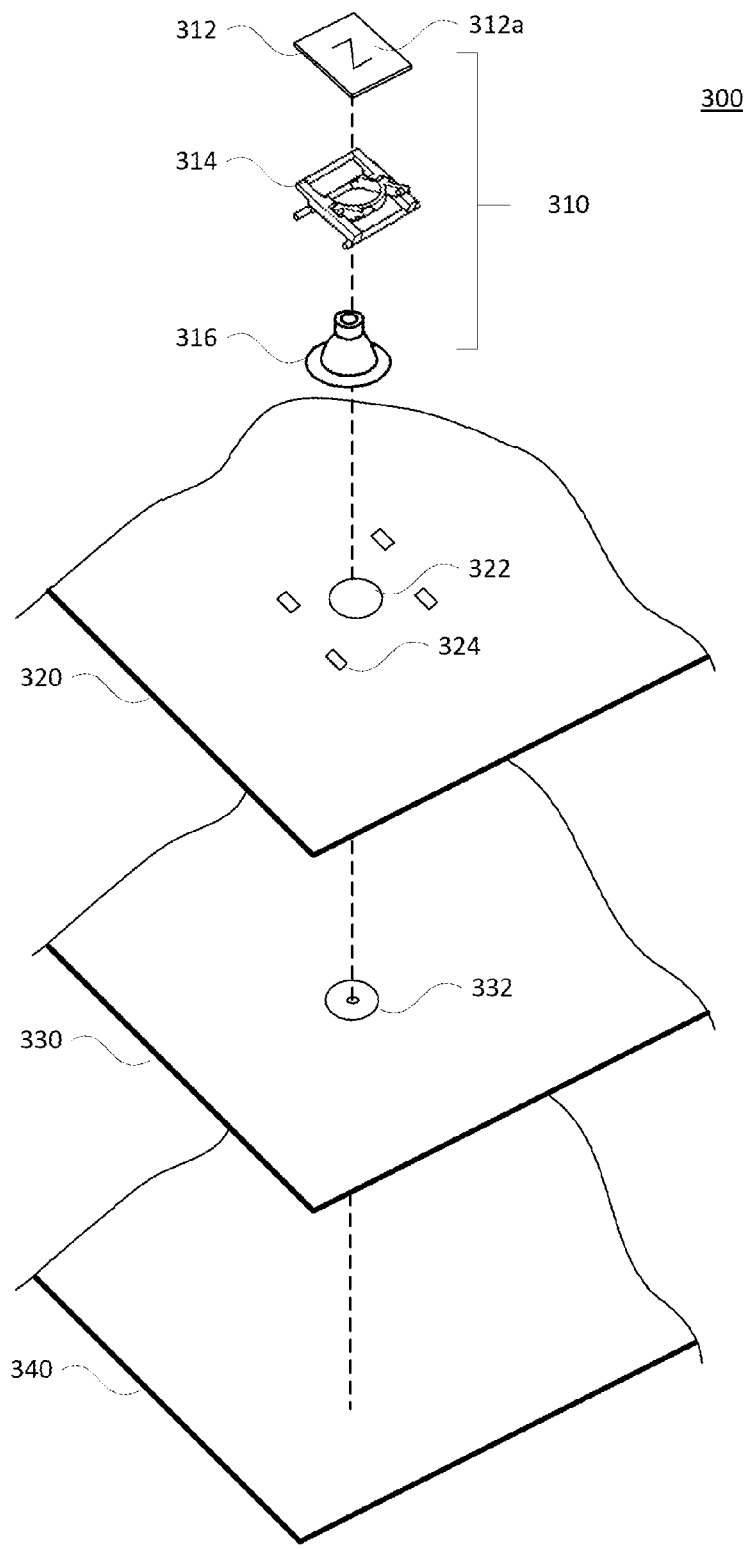
FIG. 3 is an exploded view of a section of a keyboard according to one aspect of the disclosure.

FIG. 3 is an exploded view of a section of a keyboard 300 according to one aspect of the disclosure. In this example, the keyboard 300 may be removed from a laptop computer or some other computing device. In this regard, the keyboard may be removably or semi-permanently attached to the housing of a laptop, or some other surface of the laptop, such as a palm rest.

The keyboard may include a plurality of layers, such as a top layer 310, a support layer 320, a circuit layer 330, and a base plate 340. The top layer 310 may include one or more key caps 312, a biasing member 314, and a conductive member 316. The key caps 312 may be of any size or shape. The size or shape of the key caps 312 may depend on the type of key (e.g., function, character, etc.), the device type, the keyboard size, the key pitch, as well as other factors. For example, key caps 312 corresponding to letters of a keyboard may be approximately square and may have a size of approximately 0.5 in ×0.5 in. A key cap corresponding to the space bar may be substantially rectangular and may be approximately 4 in ×0.5 in. Each of the key caps 312 may have an upper surface 312*a* exposed to a user, and the upper surface 312*a* may be of any shape. For example, the upper surface 312*a* may be convex, concave, flat, or some other shape. The upper surface 312*a* may also have one or more characters imprinted thereon, such as letters, numbers, symbols, etc. The key caps 312 may be formed of any material, and in one example may be formed of plastic. The key caps 312 may also include a lower surface 312*b* opposed to the upper surface 312*a*. The lower surface 312*b* may include one or more interfaces for engaging with the biasing member 314.

The biasing member 314 may be any type of device capable of exerting a force on the lower surface 312*b*. In this regard, for example, the biasing member 314 may be a pair of interlocking plastic pieces, a spring, or any other type of biasing mechanism. The biasing member 314 may provide a force on the lower surface 312*b* of the key cap 312, thereby allowing the key cap 312 to be in a rest position. When a user depresses a particular key cap 312, the force exerted by the user may cause the biasing member 314 to compress. The biasing member may engage with corresponding interfaces 324 of the holding layer 320.

The conductive member 316 may receive input from the key cap 312 upon a user pressing a key cap 312, and may communicate the input to another component of the computing device, such as the circuit layer 330. For example, the conductive member 316 may be a dome with a conductive portion that causes a completion of a circuit on the circuit layer 330. In another example, the conductive member 316 may be a magnetic member. In one example, each conductive member may be disposed within a corresponding hole 322 in the holding layer 320. In this regard, a lower portion of the conductive member 316 may contact the circuit layer 330. In another example, the conductive member 316 may be integrally formed with the holding layer 320.

Each of the key caps 312 may include any combination of biasing members 314, conductive members 316, or any additional mechanisms. Such additional mechanisms may include rods, bars, plungers, etc.

The holding layer 320 may include one or more holes 322 that each correspond to a conductive member 316. The support layer 320 may also include one or more interfaces 324 that engage with a corresponding biasing member 314. The holding layer 320 may be formed of any material, and in one example, may be a polymer, such as plastic. In one example, the keyboard 300 may not include a holding layer 320.

The circuit layer 330 may be any type of layer capable of receiving the user input from the conductive member 316 or the key caps 312. In one example, the circuit layer 330 may be a printed circuit board with a plurality of contacts 332 formed thereon. Each of the contacts 332 may come into contact with a portion of a respective conductive member 316, as described above, thereby causing user input to be recognized. The circuit layer 330 may connect to a processor of a computing device, and the input may be provided to the processor and displayed in a display.

The base layer 340 may connect to any of the circuit board layer 330 or the holding layer 320 and provide a base upon which the layers may be situated. The base layer may be formed of any material, and in one example may be formed of a metal, such as stainless steel or aluminum. The base layer 340 may include engagement features configured to engage with corresponding features in a computing device, such as a laptop. In one example, such features may be screw holes that may align with corresponding screw holes of a housing of a laptop computer. In another example, the features may be clips. The base layer 340 may engage with any surface or structure within the computing device.

In operation, as described above, the biasing member 314 may bias the key cap 312 in a neutral position. A user may depress the key cap 312, overcoming the biasing force provided by the biasing member 314 and causing the biasing member 314 to compress. The movement may also compress the conductive member 316, allowing a portion of the conductive member 316 to connect to the contact 332 of the circuit layer 330. This connection may complete a circuit between the conductive member 316 and the contact 322 of the circuit layer 330, allowing an electrical connection to be made. Upon making this connection, the circuit layer 330, which may be connected to a processor of the device, may provide the input to the processor. Such input may be a character, a function, or any other type of input that may be provided to a computing device. The processor may then cause such input to be displayed on a display of the device.

Figure 4:
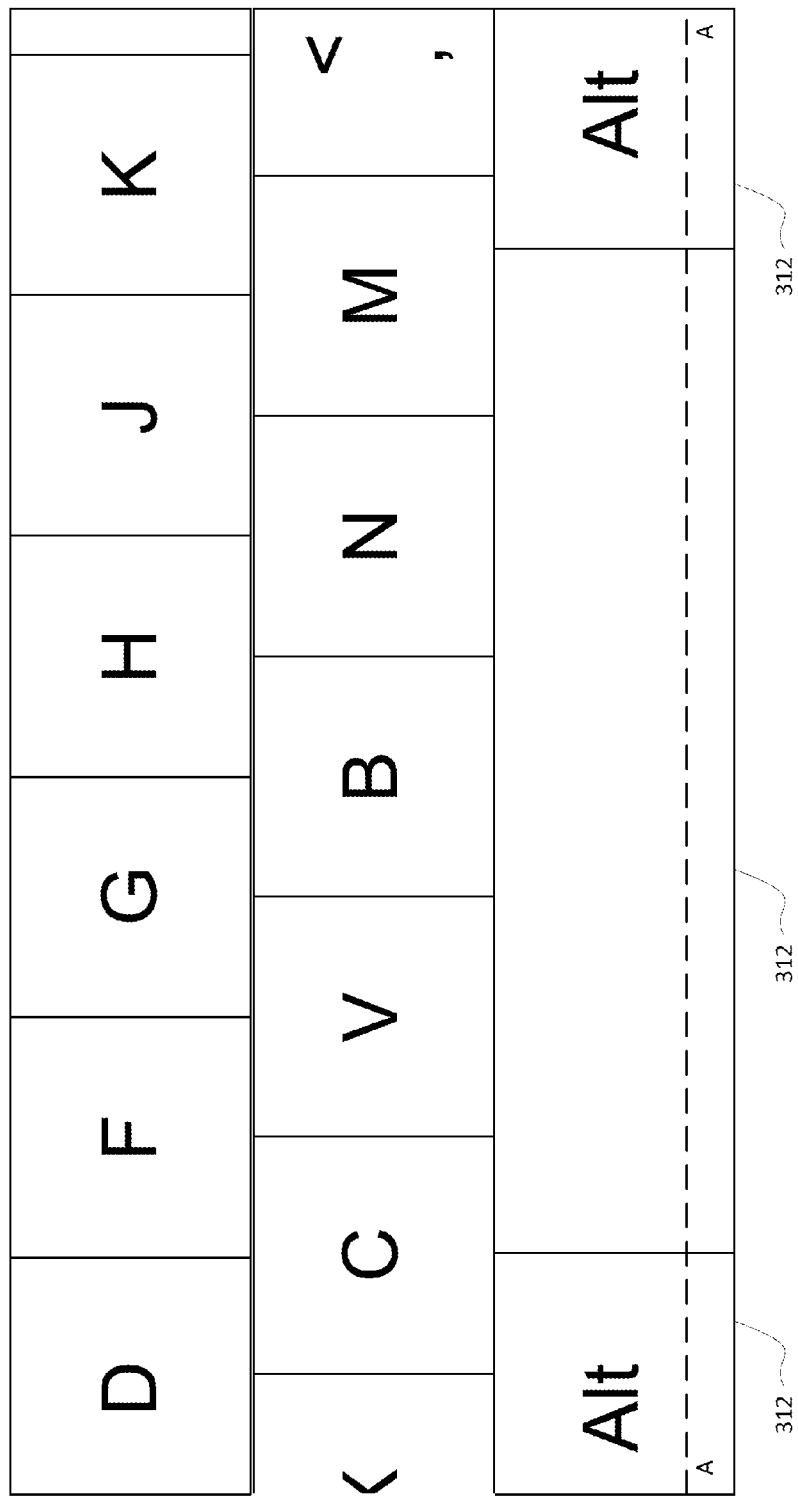
FIG. 4 is a partial top view of a keyboard according to one aspect of the disclosure.

FIG. 4 is a partial top view of a keyboard according to one aspect of the disclosure. In this example, the layers 310-340 may be assembled as a keyboard 300, which may be attached to a computing device. As shown in this figure, the keyboard 300 may include a plurality of key caps 312, such as character key caps, including alphanumeric characters, punctuation, symbols, and spaces (e.g., the space bar), and function keys caps, such as Alt, Ctrl, Shift, Tab, etc. As shown, a cross-section line A-A is depicted, which will be discussed in greater detail below with respect to FIGS. 7-9.

Figure 5:
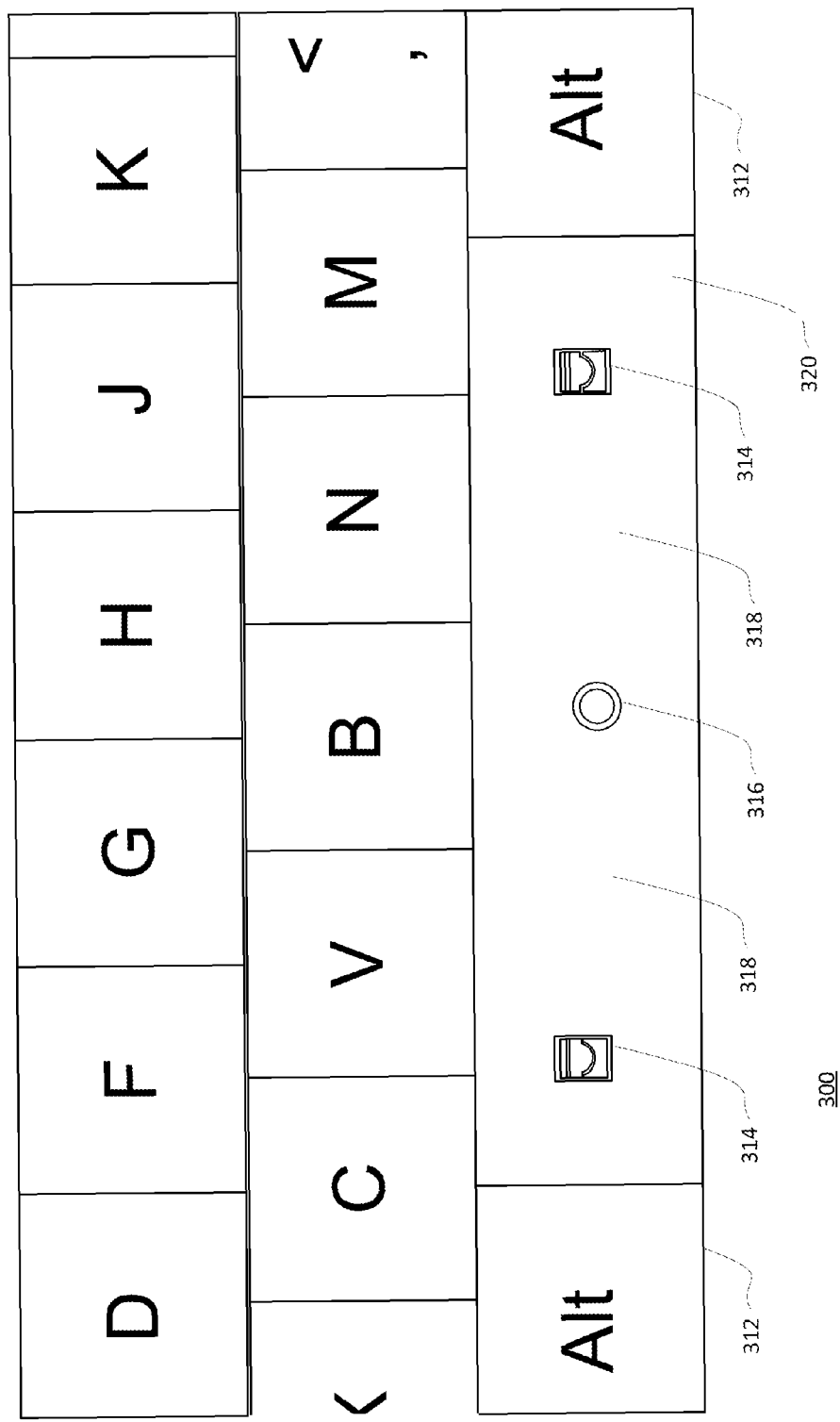
FIG. 5 is a partial top view of the keyboard of FIG. 4 with a key cap removed therefrom.

FIG. 5 is a partial top view of the keyboard of FIG. 4 with a key cap 312 removed therefrom. In this example, the removed key cap 312 is the spacebar. With the key cap 312 removed, two biasing members 314, a conductive member 316, as well as the holding layer 320 may be visible to a user. Each of the biasing members 314 may be disposed at distal portions of the support layer 320 with respect to the removed keycap 312. The conductive member 316 may be located at a central position on the support layer 320 with respect to the removed keycap 312. This configuration allows a space 318 to be defined in between the conductive member 316 and the biasing member 314. The space 318 may also be defined in between the keycap 312 and the support layer 320, as well as between adjacent key caps 312, biasing members 314, conductive members 316, or any housing or structure within a computing device.

Figure 6:
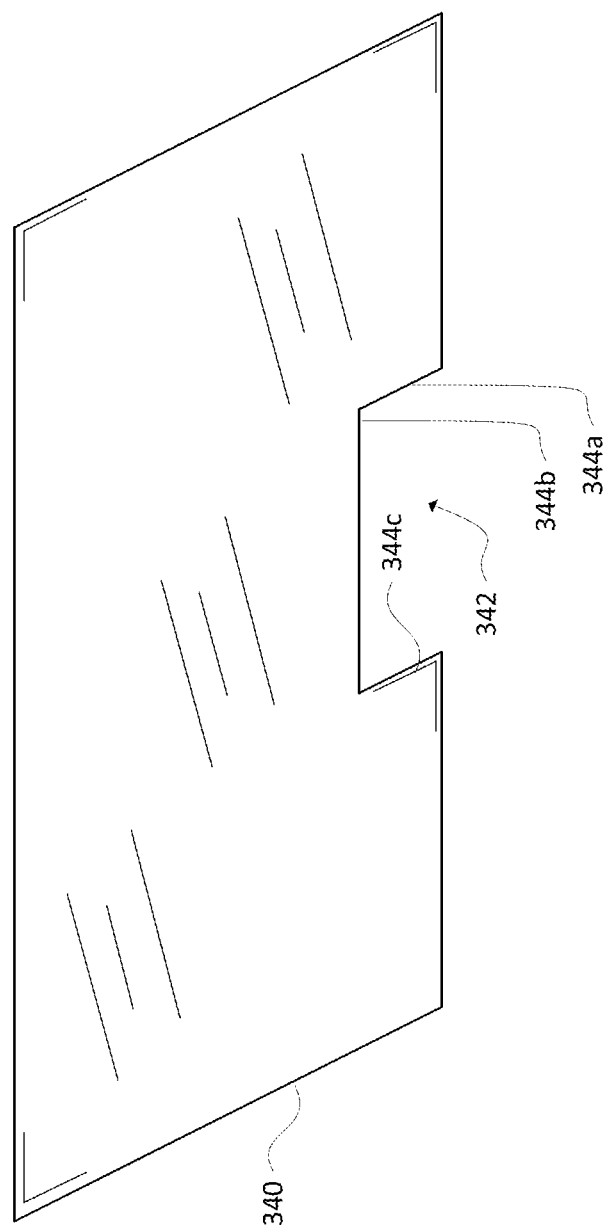
FIG. 6 is an isolated view of the base layer according to one aspect of the disclosure.

FIG. 6 is an isolated view of the base layer 340 according to one aspect of the disclosure. In this example, the base layer 340 may include a cutout 342. The cutout 342 may be any shape, and may have a perimeter at least partially defined by one or more interior edges 344a, 344b, and 344c of the base layer 340. In this regard, the cutout 342 may have an overall shape defined by the interior edges 344a-c. The cutout 342 may be any shape, such as a portion of a rectangle, square, or any other geometric shape. In one example, the edges 344a-c may be at least partially curved. In yet another example, the cutout 342 may be defined by a single interior edge, or more than the interior edges depicted in FIG. 6. The cutout 342 may be any size, and in one example, may correspond to at least a portion of an outline of a given key cap 312. For example, the cutout 342 may have dimensions similar to any key cap 312, such as a character key or a function key. In one example, the cutout 342 may be approximately the same size as a space bar. The cutout 342 may be larger or smaller than any particular key cap 312. In the present example, the cutout 342 may be align with a portion of a key cap 312, such that the outlines of both the cutout 342 and a particular key cap 312 may at least partially, or completely, overlap with respect to a direction perpendicular to one or more of the layers 310-340. The cutout 342 may be formed at any edge of the base layer 340.

Although not depicted, the base layer 340 may include features that may connect to the biasing members 314.

Figure 7:
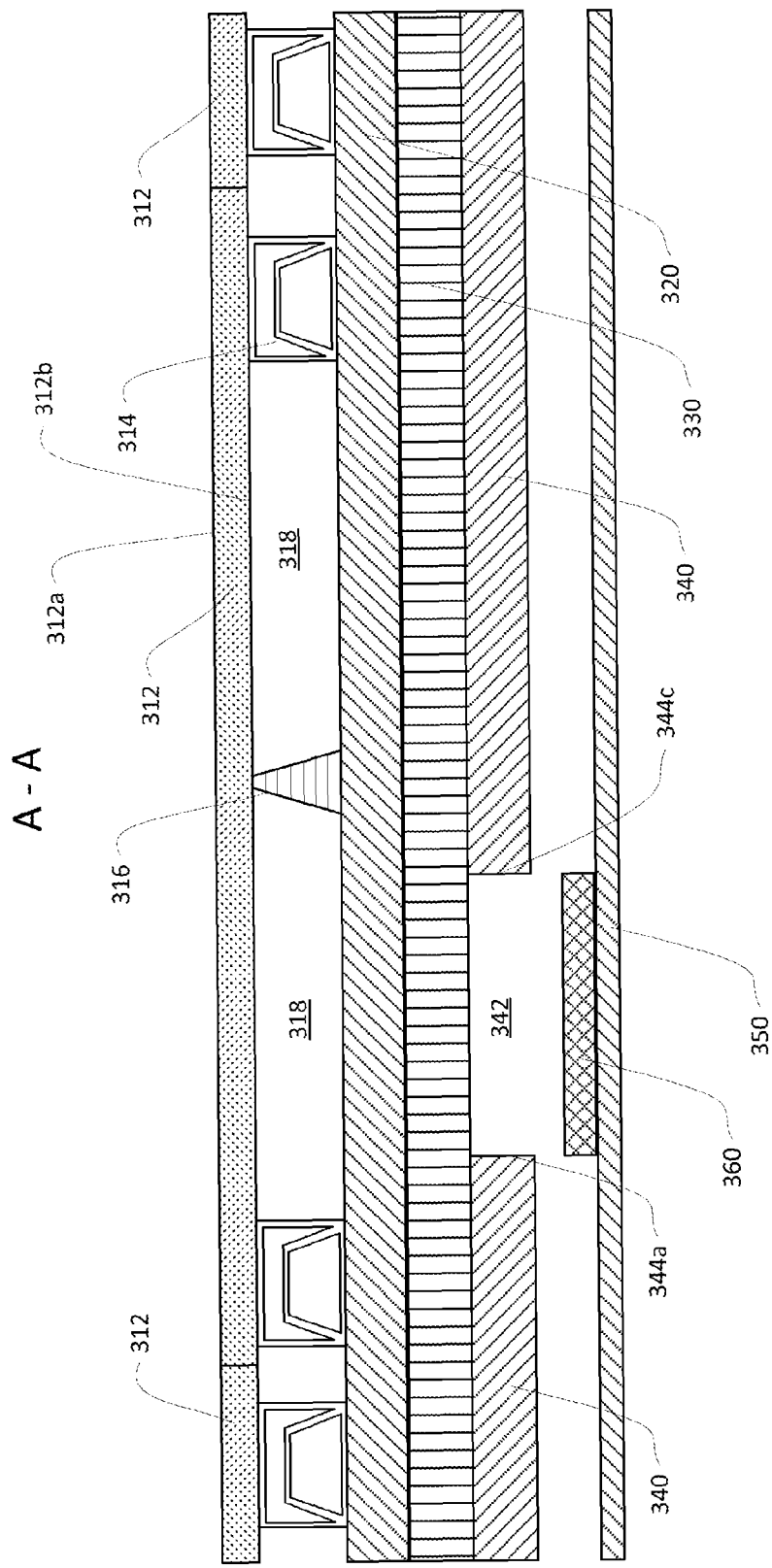
FIG. 7 is a cross section of the keyboard of FIG. 4 along cross section line A-A according to one aspect of the disclosure.

FIG. 7 is a cross section of the keyboard 300 of FIG. 4 along cross section line A-A according to one aspect of the disclosure. In this example, an antenna 360 may be mounted to a structural member 350 of the computing device. The antenna 360 may at least partially overlap the cutout 342 of the base layer 340 with respect to a direction perpendicular to at least one of the layers 310-340. In this regard, the antenna 360 may receive electromagnetic radiation, such as radio waves, through the cutout 342 of the base layer 340 from one or more external sources that may have otherwise been blocked or interfered with by base layer 340. Such external sources may include, for example, WiFi hotspots, satellites, cell towers, other computing devices, or any other device of mechanism capable of generating signals.

The structural member 350 may be any type of surface or structure associated with a computing device that may support the components of the device, such as a housing, a bracket, screw boss, arm, or the like. For example, the antenna 360 may be in connection with screws of grounding points of the housing of the computing device. In another example, the structural member 350 may connect to one or more layers of the keyboard 300.

The antenna 360 may be any type of antenna capable of receiving electromagnetic radiation, such as radio waves, infrared, etc. In one example, the antenna 360 may be a printed circuit board, and may be connected to the processor, or a separate transceiver within the computing device. The antenna 360 may receive data or information, and may transmit the information to the processor or transceiver by one or more wires (not shown). The antenna 360 may be any size, and in one example may be approximately 0.5 in×0.5 in.

Although FIG. 7 depicts cutout 342 as being approximately the same size as antenna 360, the cutout 342 may be larger or smaller than antenna 360. The cutout 342 may also be offset from the antenna 360, such that one or more of the interior edges 344a-c may not correspond to any edges of the antenna 360.

Figure 8:
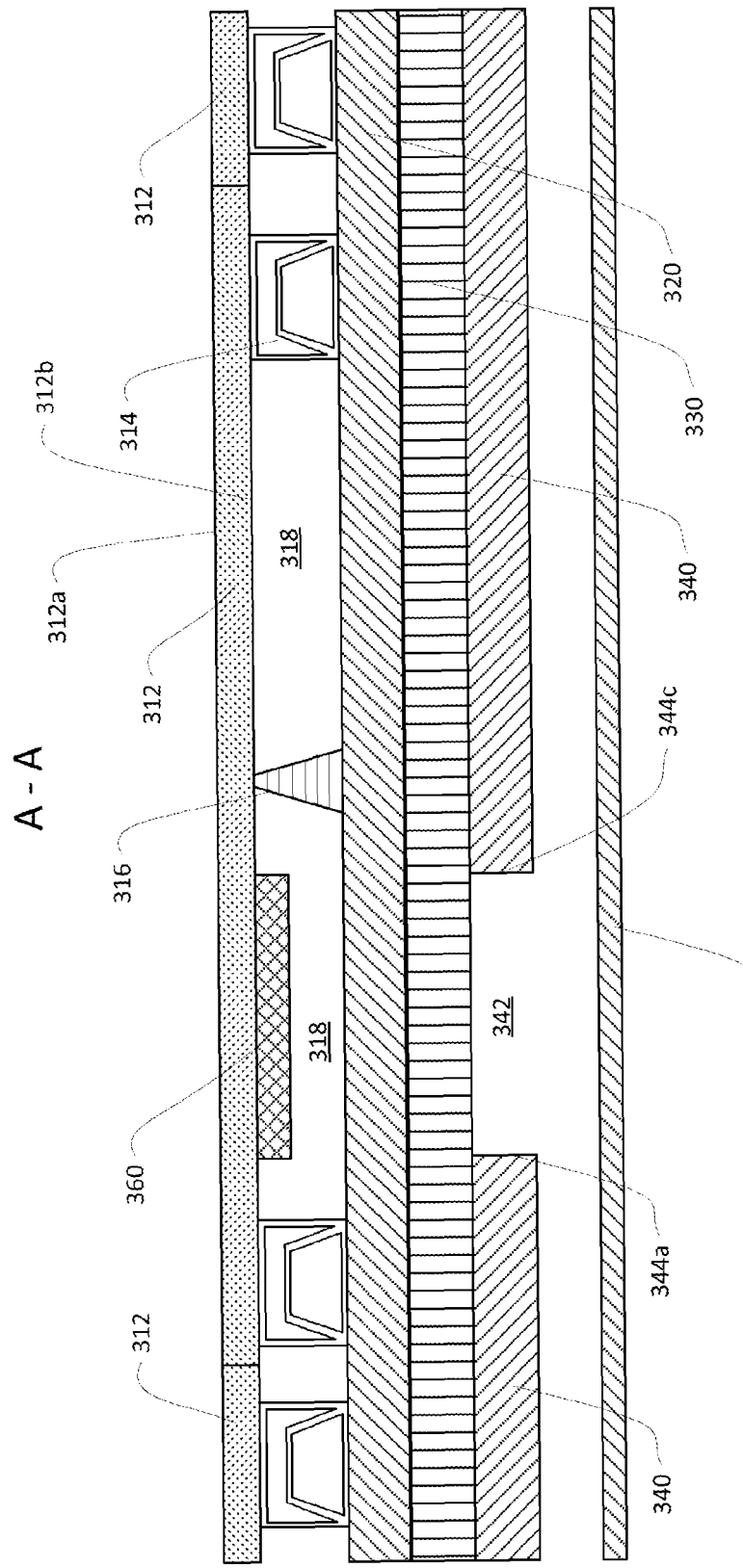
FIG. 8 is a cross-section of the keyboard of FIG. 4 along cross section line A-A according to another aspect of the disclosure.

FIG. 8 is a cross-section of the keyboard 300 of FIG. 4 along cross section line A-A according to another aspect of the disclosure. In this example, the antenna 360 may be mounted to a lower surface 312b of the key cap 312. The antenna 360 may be mounted to any key cap 312, such as a character key cap or a function key cap. In one example, the antenna 360 may be mounted to a space bar key cap. In this regard, the antenna 360 may be at least partially within the space 318 defined between the biasing member 314 and the conductive member 316. As in the example above, the wiring connecting the antenna 360 to the processor or transceiver is not shown.

In one example, the antenna 360 may be laminated onto the lower surface 312*b* of the key cap 312 by a pressure sensitive adhesive (PSA).

Figure 9:
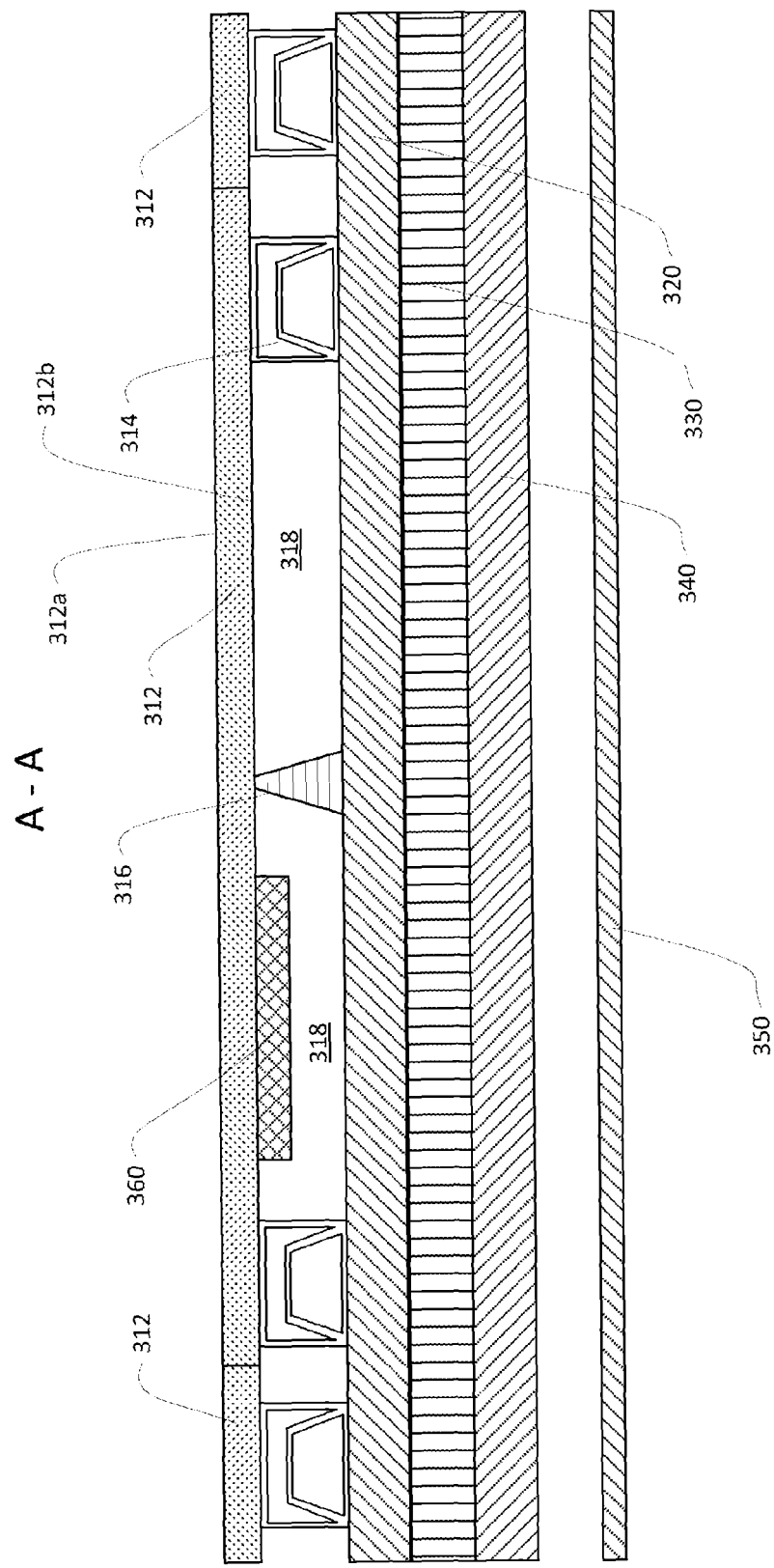
FIG. 9 is a cross section of the keyboard 300 of FIG. 4 along cross section line A-A according to another aspect of the disclosure.

FIG. 9 is a cross section of the keyboard 300 of FIG. 4 along cross section line A-A according to another aspect of the disclosure. In this example, as in the example of FIG. 8, the antenna 360 may be mounted to the lower surface 312*b* of the key cap 312. In this example, the base plate 340 may not include a cutout 342. As in the above example, the wiring connecting the antenna 360 to the processor or transceiver is not shown.

As these and other variations and combinations of the features discussed above can be utilized without departing from the subject matter defined by the claims, the foregoing description of the embodiments should be taken by way of illustration rather than by way of limitation of the subject matter defined by the claims. It will also be understood that the provision of the examples disclosed herein (as well as clauses phrased as "such as," "including" and the like) should not be interpreted as limiting the claimed subject matter to the specific examples; rather, the examples are intended to illustrate only one of many possible embodiments. Further, the same reference numbers in different drawings may identify the same or similar elements.

The invention claimed is:

1. A computing device comprising: a processor; a memory coupled to the processor; a support structure; an input coupled to the processor, the input comprising:
    a top layer including a plurality of key caps, the plurality of key caps configured to receive input from a user; a circuit layer disposed between the top layer and a base layer, the circuit layer being coupled to the processor and being configured to receive input from the plurality of key caps; and the base layer having a first surface disposed adjacent to a surface of the circuit layer and a second surface opposite the first surface and remote from the circuit layer, wherein the base layer includes a cutout formed therein, a perimeter of the cutout being at least partially defined by an interior edge of the base layer, the perimeter defining an opening extending from the first surface to the second surface; and
    an antenna mounted on a surface of the support structure I that faces the second surface of the base layer, the antenna configured to receive a signal from an external source, wherein the antenna substantially aligns with the opening of the cutout, at least a portion of the circuit layer, and a portion of the plurality of key caps in a direction perpendicular to at least one of the top layer, circuit layer, or base layer.

2. The computing device of claim 1, wherein the support structure is selected from the group consisting of: a computing device housing, brackets, screws, and arms.

3. The computing device of claim 2, wherein the support structure comprises one or more screws at grounding points of the housing of the computing device.

4. The computing device of claim 2, wherein the support structure is connected to one or more layers of the keyboard.

5. The computing device of claim 1, wherein the cutout is defined by a plurality of interior edges of the base layer.

6. The computing device of claim 1, wherein an area of the cutout is less than or equal to an area of the antenna.

7. The computing device of claim 1, wherein an area of the cutout is greater than or equal to an area of the antenna.

8. The computing device of claim 1, wherein the top layer further comprises a plurality of conductive members, the conductive members being configured to communicate the input from the plurality of key caps to the circuit layer.

9. The computing device of claim 8, further comprising a holding layer disposed adjacent to a surface of the circuit layer opposed to the surface adjacent to the base layer.

10. The computing device of claim 9, wherein the plurality of conductive members are integrally formed with the holding layer.

11. An input for a computing device, the input comprising:
    a top layer including a plurality of key caps, the plurality of key caps configured to receive input from a user;
    a circuit layer disposed between the top layer and a base layer, the circuit layer being configured to receive input from each of the plurality of key caps; and the base layer having a first surface disposed adjacent to a surface of the circuit layer and a second surface opposite the first surface and remote from the circuit layer, wherein the base layer includes a cutout formed therein, a perimeter of the cutout being at least partially defined by an interior edge of the base layer, the perimeter defining an opening extending from the first surface to the second surface; wherein the opening of the cutout substantially covers by at least a portion of the circuit layer and aligns with an antenna in a direction perpendicular to at least one of the top layer, circuit layer or the base layer, the antenna being aligned also with a portion of the plurality of key caps and mounted on a surface of a support structure of the computing device that faces the second surface of the base layer, the antenna configured to receive a signal from an external source.

12. The computing device of claim 11, wherein the support structure is selected from the group consisting of: a computing device housing, brackets, screws, and arms.

13. The computing device of claim 12, wherein the support structure comprises one or more screws at grounding points of the housing of the computing device.

14. The computing device of claim 12, wherein the support structure is connected to one or more layers of the keyboard.

15. The computing device of claim 11, wherein the cutout is defined by a plurality of interior edges of the base layer.

16. The computing device of claim 11, wherein an area of the cutout is less than or equal to an area of the antenna.

17. The computing device of claim 11, wherein an area of the cutout is greater than or equal to an area of the antenna.

18. The computing device of claim 11, wherein the top layer further comprises a plurality of conductive members, the conductive members being configured to communicate the input from the plurality of key caps to the circuit layer.

19. The computing device of claim 18, further comprising a holding layer disposed adjacent to a surface of the circuit layer opposed to the surface adjacent to the base layer.

20. The computing device of claim 19, wherein the plurality of conductive members are integrally formed with the holding layer.

* * * * *